United States Patent
Chou et al.

(10) Patent No.: US 8,507,140 B1
(45) Date of Patent: Aug. 13, 2013

(54) HYDROGEN-RECYCLABLE FUEL CELL

(76) Inventors: Shih-Hang Chou, Nantou County (TW); Jyun-Sih Wang, New Taipei (TW)

(*) Notice: Subject to any disclaimer, the term of this patent is extended or adjusted under 35 U.S.C. 154(b) by 0 days.

(21) Appl. No.: 13/604,651

(22) Filed: Sep. 6, 2012

(30) Foreign Application Priority Data

Jul. 13, 2012 (TW) .............................. 101125346 A

(51) Int. Cl.
*H01M 8/06* (2006.01)
*H01M 8/10* (2006.01)

(52) U.S. Cl.
USPC ............ 429/417; 429/413; 429/524; 429/527

(58) Field of Classification Search
USPC ........................................................ 429/417
See application file for complete search history.

(56) References Cited

U.S. PATENT DOCUMENTS

| 6,790,551 B2 * | 9/2004 | Venkatesan et al. | 429/406 |
| 6,794,070 B2 * | 9/2004 | Amrhein et al. | 429/416 |
| 7,678,480 B2 * | 3/2010 | Shimoi | 429/413 |
| 2005/0064274 A1 * | 3/2005 | Reichman et al. | 429/40 |

* cited by examiner

*Primary Examiner* — John S Maples

(57) ABSTRACT

The present invention discloses a hydrogen-recyclable fuel cell comprising anode set, cathode set, catalytic layer, proton exchange membrane, hydrogen delivering device, hydrogen-storage complex metal layer and hydrogen drawing device. The hydrogen delivering device delivers hydrogen to the catalytic layer which ionizes hydrogen into electrons and hydrogen ions. After the hydrogen ions pass through the proton exchange membrane, they react with the hydrogen-storage complex metal layer and the electrons to produce complex metal hydrides. The hydrogen drawing device draws hydrogen from the complex metal hydrides into the storage tank for further reuse.

10 Claims, 8 Drawing Sheets

HYDROGEN-RECYCLABLE FUEL CELL

FIELD OF THE INVENTION

The present invention relates to a hydrogen-recyclable fuel cell, particularly to a fuel cell which applies a reusable technique allowing hydrogen to be recycled.

BACKGROUND OF THE INVENTION

The prior art of a hydrogen fuel cell converts chemical energy of the hydrogen into electrical energy. The mechanism shown in FIGS. 9 and 10, comprises an anode set 110, a cathode set 120, a proton exchange membrane 141, a hydrogen delivering device 142, an oxygen delivering device 143 and a water outlet 144. The proton exchange membrane 141 is defined between the anode set 110 and the cathode set 120, and each of its two sides is tightly lain by a catalytic layer 140 (a platinum or palladium catalytic layer) respectively.

Shown as FIG. 10, the anode set 110 includes a first electrode plate 111, a first diversion plate 112, a gas supply duct 145 and a first clasp plate 180. The first diversion plate 112 lies tightly between the first electrode plate 111 and the catalytic layer 140. The first clasp plate 180 lies tightly on the exterior side of the first electrode plate 111 with a gas inlet 182. One end of the gas inlet 182 links to the hydrogen delivering device 142, and the other end links to the gas supply duct 145. The gas supply duct 145 penetrates through the first electrode plate 111 and links to the gas diversion pathway 112a of the first diversion plate 112. The cathode set 120 includes a second electrode plate 121, a second diversion plate 122, a gas supply duct 146 and a second clasp plate 181. The second diversion plate 122 lies tightly between the second electrode plate 121 and another catalytic layer 140. The second clasp plate 181 lies tightly on the exterior side of the second electrode plate 121 with a gas inlet 183. The gas supply duct 146 penetrates through the second electrode plate 121 and links to the gas diversion pathway 122a of the second diversion plate 122. One end of the gas inlet 183 links to the oxygen delivering device 143, and the other end links to the gas supply duct 146. A plurality of bolts 184 are employed to fasten stacks of required assembly as a hydrogen fuel cell set. While entering the anode set 110, hydrogen is ionized by the catalytic layer 140 to electrons and hydrogen ions. The electrons move into the cathode set 20 via external load circuit 90. The hydrogen ions, passing through the proton exchange membrane 141, react with the electrons from the external load circuit 90 and oxygen from the cathode set 120 to produce water and heat. The water is drained from the water outlet 144.

The prior art of the hydrogen fuel cell needs two platinum or palladium catalytic layers which increase material cost for manufacturing. Furthermore, the prior art of a hydrogen fuel cell needs hydrogen ions to react with oxygen and electrons in order to ensure the electricity being normally discharged to its load for the cell. Its unrecyclable hydrogen ions are a waste of hydrogen source and the life cycle of the hydrogen fuel cell is decreased. A special property of the hydrogen-storage complex metal is to adsorb and store hydrogen at high pressure or low temperature circumstances and to produce complex metal hydrides. The hydrogen-storage complex metal will reversely release the adsorbed hydrogen at low pressure or high temperature circumstances, and it also has certain advantages such as a higher capacity to store hydrogen, easier to be activated, faster rate to adsorb or release hydrogen, longer life cycle and lower cost. Therefore, the hydrogen-storage complex metal has been widely applied to many industries like refrigeration equipments, hydrogen storage of fuel cells and negative electrode production of Ni-MH secondary batteries. Wherein, the difference between a Ni-MH secondary battery and a Ni—Cd secondary battery is that Ni-MH secondary battery uses hydrogen-storage complex metal to replace cadmium as its negative electrode. When the hydrogen-storage complex metal is charged in potassium hydroxide electrolyte, electrochemical reaction proceeds on the surface of the complex metal. Hydrogen atoms off the water molecules move and diffuse towards the surface of the complex metal, react with the complex metal and produce metal hydrides with heat released. Though the application of hydrogen-storage complex metal in the Ni-MH secondary battery improves the reaction efficiency at the negative electrode, it is unable to recycle the hydrogen for further reuse. In the long run, it is relatively easier to cause environmental pollution.

SUMMARY OF THE INVENTION

The object of the present invention is to provide a hydrogen-recyclable fuel cell with a platinum or palladium catalytic layer. In order to achieve above object, the present invention comprises an anode set, a cathode set, a catalytic layer, a proton exchange membrane, a hydrogen delivering device, a hydrogen-storage complex metal layer and a hydrogen drawing device. The catalytic layer lies tightly between the first electrode plate and the proton exchange membrane and it forms electrical conductivity with the first electrode plate. The hydrogen delivering device delivers hydrogen to the catalytic layer which ionizes hydrogen into electrons and hydrogen ions. The hydrogen-storage complex metal layer lies tightly between the proton exchange membrane and the second electrode plate and it forms electrical conductivity with the second electrode plate. After the hydrogen ions pass through the proton exchange membrane, they react with the hydrogen-storage complex metal layer and the electrons to produce complex metal hydrides. The hydrogen drawing device is employed to draw hydrogen from the complex metal hydrides for further reuse.

DETAILED DESCRIPTION OF THE PREFERRED EMBODIMENT

I. Concept of the Present Invention

Figure 1:
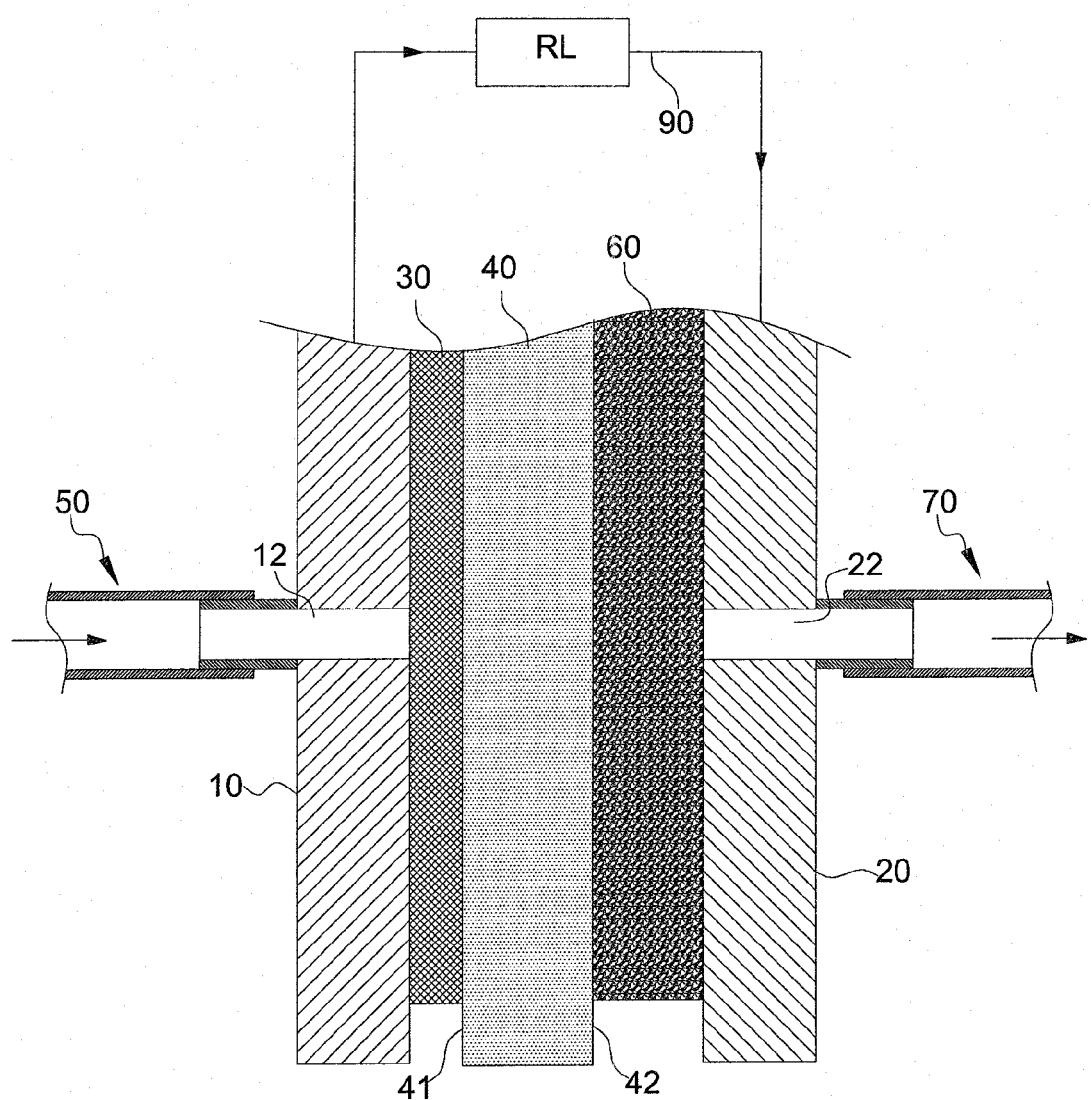
FIG. 1 is a cross sectional schematic drawing of the fundamental structure in accordance with the present invention.

The present invention is different from the prior art of fuel cells. It does not need an oxygen supply device (such as a piping and a pump) and a secondary catalytic layer, because the ionized hydrogen ions do not have to react with electrons and oxygen for producing water and heat in the present invention. The technical concept of the present invention is to recycle and reuse hydrogen in a fuel cell with a hydrogen drawing device which allows hydrogen ions retrieved from a proton exchange membrane to react with electrons obtained from an external load circuit and a hydrogen-storage complex metal layer and then to form complex metal hydrides for hydrogen storage. Therefore, only one catalytic layer is required in the cathode set or the proton exchange membrane to save the cost of a second catalytic layer, and the recycled hydrogen is able to supply further reuse in the present invention. With the ideas depicted above, the cost reduction of manufacturing material and hydrogen fuel can be achieved.

II. Features of the Present Invention

Referring to FIG. 1 to FIG. 4, a fundamental embodiment of the present invention comprises an anode set 10, a cathode set 20, a catalytic layer 30, a proton exchange membrane 40, a hydrogen delivering device 50, a hydrogen-storage complex metal layer 60 and a hydrogen drawing device 70. The anode set 10 includes a first electrode plate 11 and the cathode set 20 includes a second electrode plate 21. The first electrode plate 11 and the second electrode plate 21 are to be an electric circuit when they electrically conduct with each other. The proton exchange membrane 40 is located between the first electrode plate 11 and the second electrode plate 21. The catalytic layer 30 is defined between the first electrode plate 11 and the proton exchange membrane 40, lies against the first side 41 of the proton exchange membrane 40 facing towards the first electrode plate 11, and forms electrical conductivity with the first electrode plate 11. The hydrogen delivering device 50 delivers hydrogen to the catalytic layer 30 which ionizes hydrogen to electrons and hydrogen ions. The electrons are discharged from the first electrode plate 11 to said second electrode plate 21 while the hydrogen ions move towards the second electrode plate 21 through the proton exchange membrane 40. The present invention is different from the prior art of fuel cells, the hydrogen-storage complex metal layer 60 is defined between the proton exchange membrane 40 and the second electrode plate 21, lies against the second side 42 of the proton exchange membrane 40 facing towards the second electrode plate 21, and forms electrical conductivity with the second electrode plate 21. After the hydrogen ions pass through the proton exchange membrane 40, the hydrogen ions react with the hydrogen-storage complex metal layer 60 and the electrons from the second electrode plate 21 to produce complex metal hydrides. The hydrogen drawing device 70 is employed to draw hydrogen from complex metal hydrides for further reuse.

III. Embodiments of the Present Invention

Figure 4:
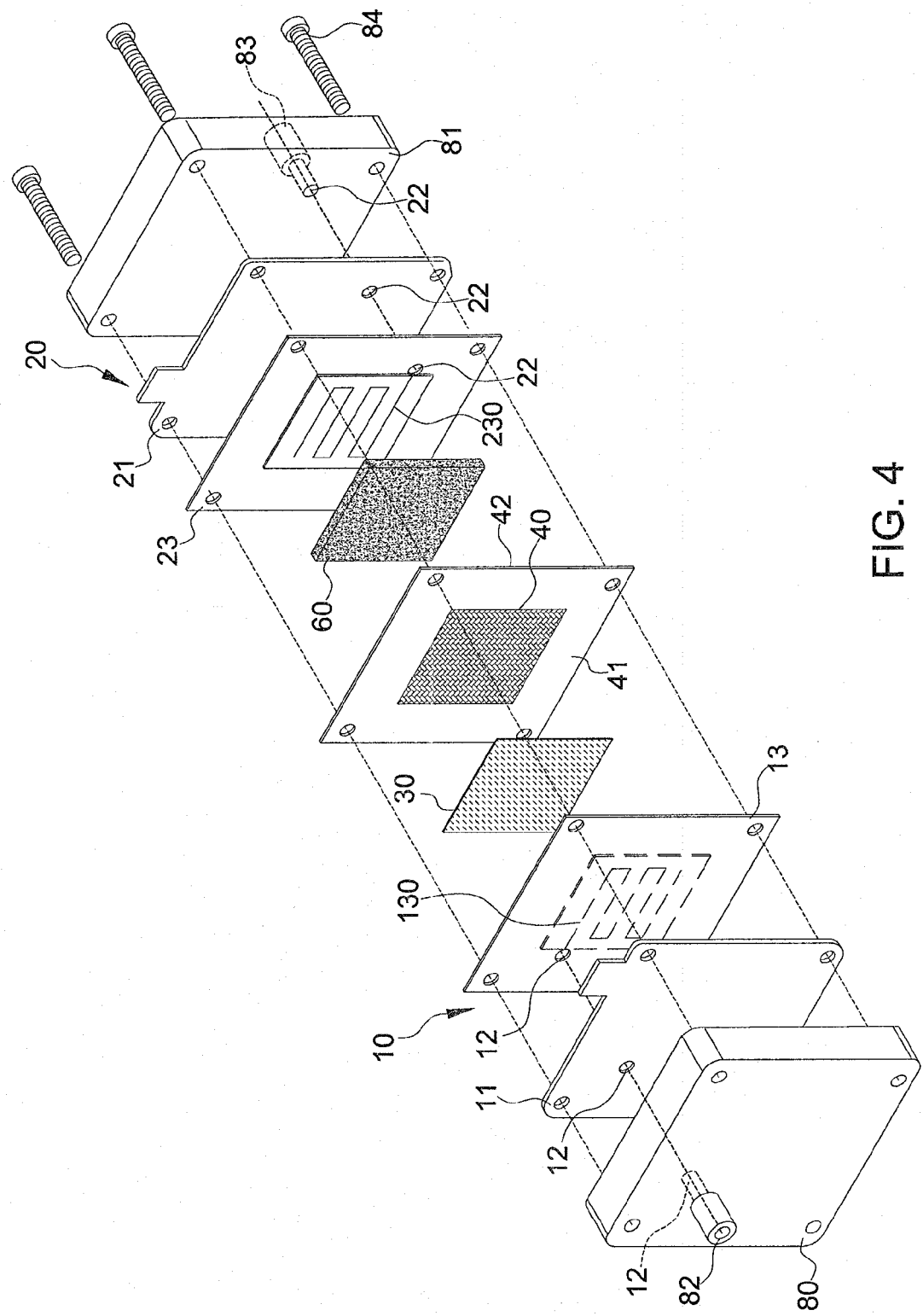
FIG. 4 is an exploded schematic drawing of a singular hydrogen-recyclable fuel cell in accordance with the present invention.
Figure 5:
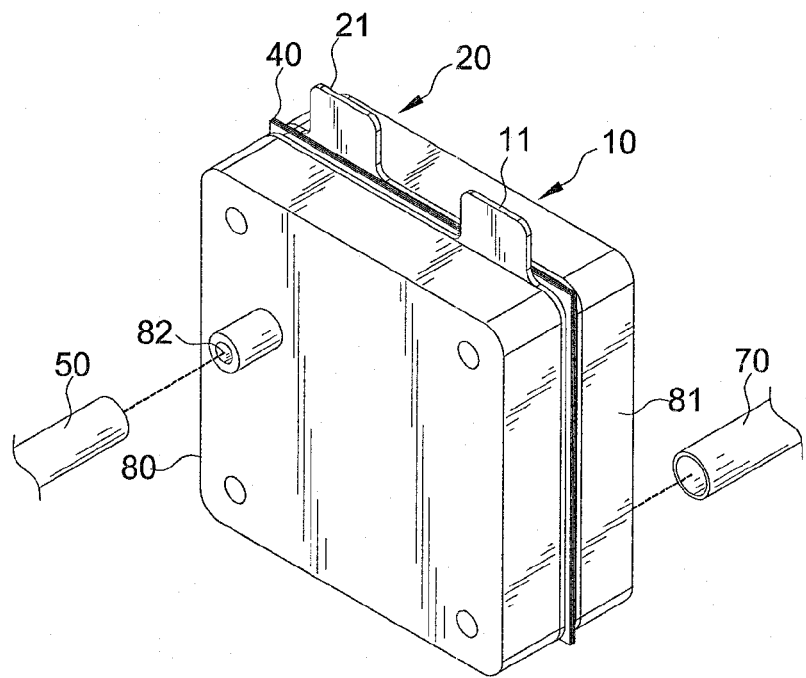
FIG. 5 is an assembled perspective view of a singular hydrogen-recyclable fuel cell in accordance with the present invention.
Figure 8:
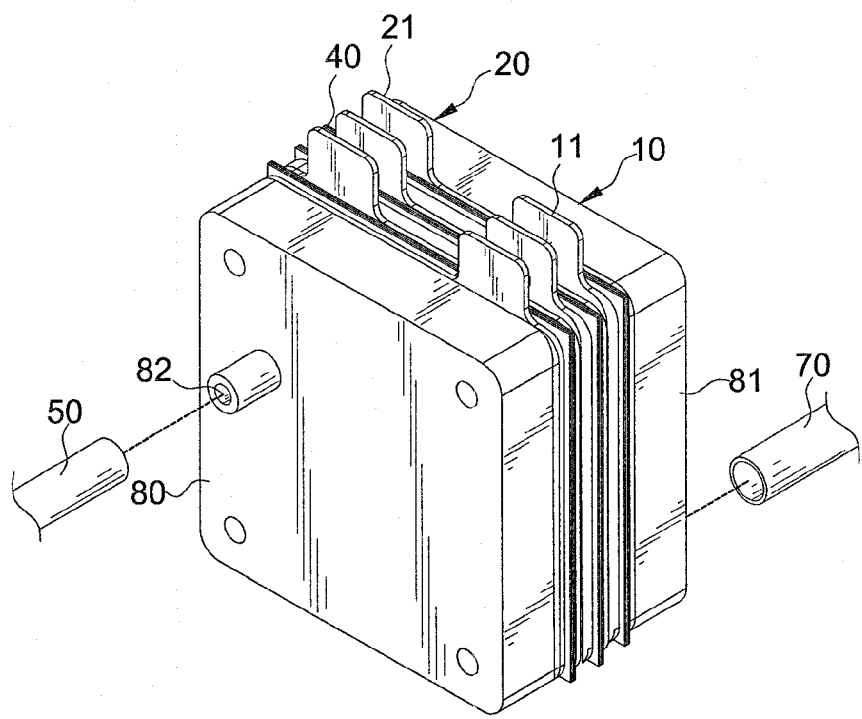
FIG. 8 is an assembled perspective view of three stacked singular hydrogen-recyclable fuel cells in accordance with the present invention.
Figure 6:
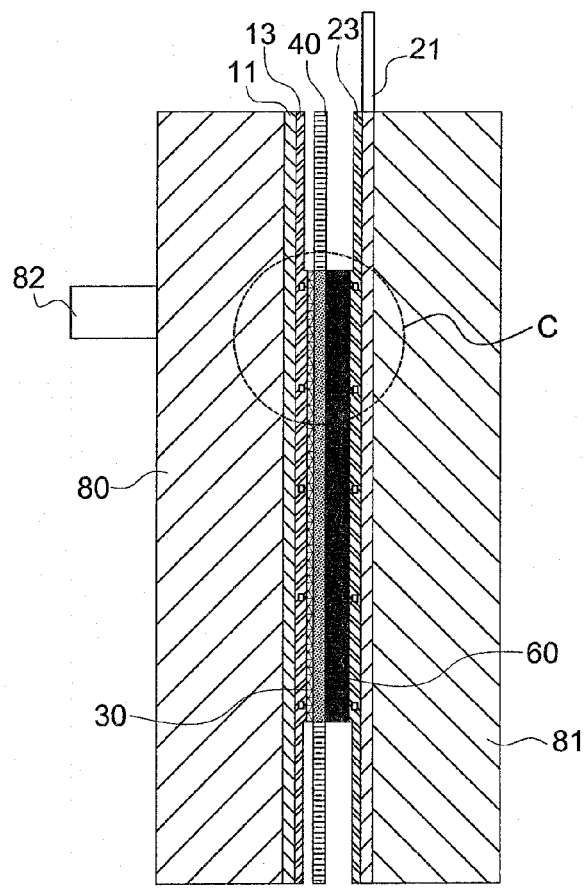
FIG. 6 is an assembled cross sectional drawing of a singular hydrogen-recyclable fuel cell in accordance with the present invention.
Figure 7:
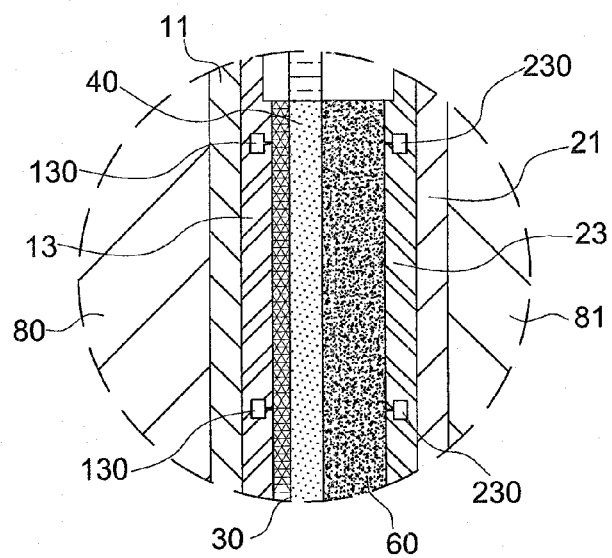
FIG. 7 is an enlarged view of circle C in FIG. 6.
Figure 9:
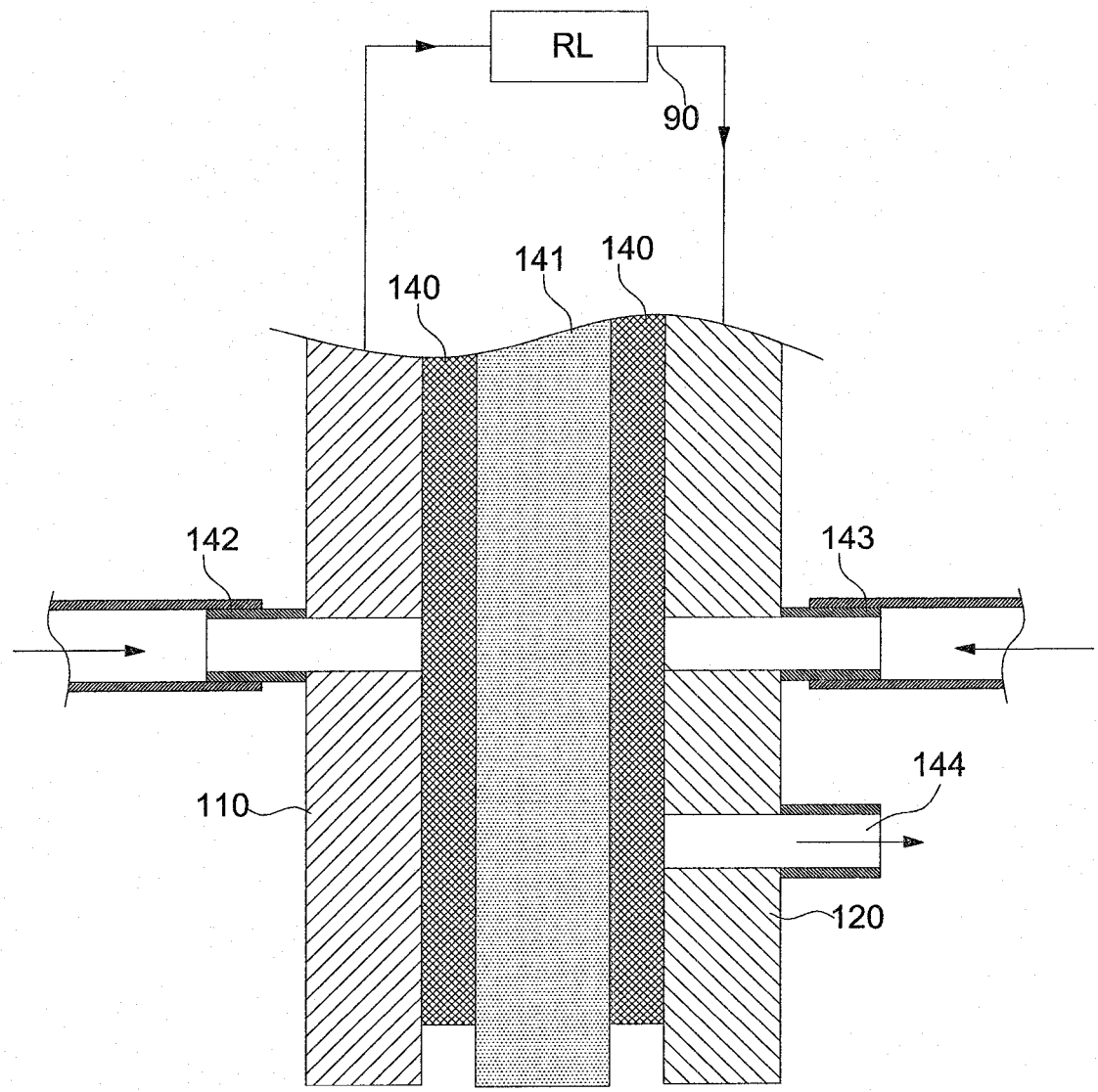
FIG. 9 is a cross sectional schematic drawing of the fundamental structure in accordance with the prior art of the hydrogen fuel cell.
Figure 10:
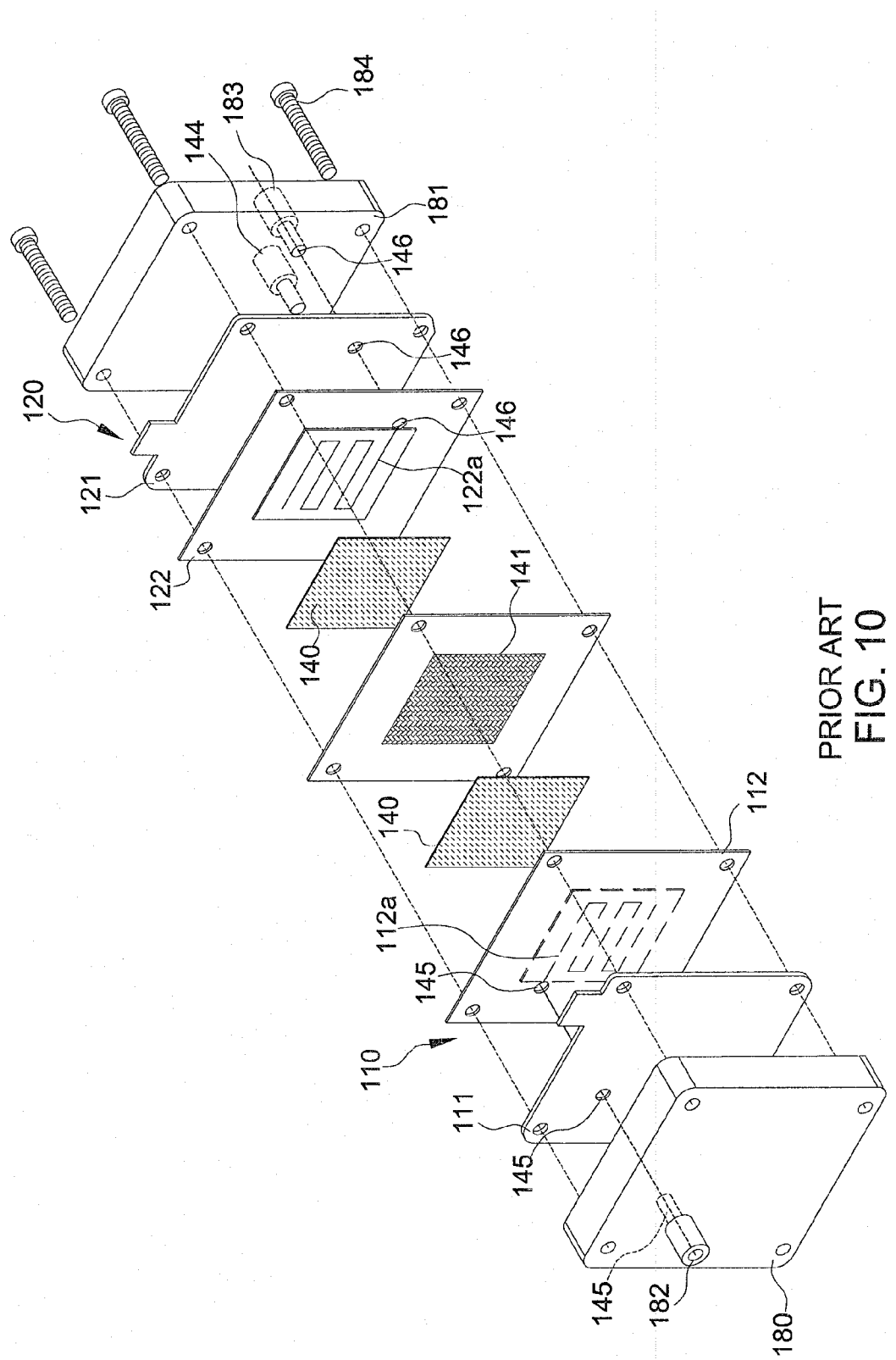
FIG. 10 is an exploded embodiment diagram in accordance with the prior art of the hydrogen fuel cell.

Referring to FIG. 4 to FIG. 8, a more specific embodiment of the present invention comprises an anode set 10, a cathode set 20, a catalytic layer 30 (made by the material of platinum or palladium), a proton exchange membrane 40, a hydrogen delivering device 50, a hydrogen-storage complex metal layer 60 and a hydrogen drawing device 70. The catalytic layer 30 and the hydrogen-storage complex metal layer 60 lie upon two sides 41, 42 of the proton exchange membrane 40 respectively. In one embodiment, the catalytic layer 30 lies tightly upon the first side 41 of the proton exchange membrane 40. The hydrogen-storage complex metal layer 60 is formed by a specific amount of hydrogen-storage complex metal powder via powder metallurgy process, lies tightly upon the second side 42 of the proton exchange membrane 40. In another embodiment, the catalytic layer 30 lies tightly upon the first electrode plate 11 and faces towards the first side 41 of the proton exchange membrane 40. The hydrogen-storage complex metal layer 60 is formed by a specific amount of hydrogen-storage complex metal powder via powder metallurgy process, lies tightly upon the second electrode plate 21 and faces towards the first side 41 of the proton exchange membrane 40. The hydrogen-storage complex metal coating technology depicted above, either powder spraying or powder coating, is the same as the prior art wherein the thickness of the hydrogen-storage complex metal layer 60 is multiple of the thickness of the catalytic layer 30. In a specific embodiment, the complex metal of the hydrogen-storage complex metal layer 60 could be magnesium alloy series, rear earth elements alloy series, titanium alloy series or iron alloy series. FIG. 4 is an exploded schematic drawing of a singular hydrogen-recyclable fuel cell, and FIGS. 5 and 7 are assembled schematic drawings of a singular hydrogen-recyclable fuel cell in accordance with the present invention. FIG. 8 is an assembled schematic drawing of a fuel cell stacked by three sets of singular hydrogen-recyclable fuel cell which are employed to increase the potential between the anode set 10 and the cathode set 20.

Referring to FIGS. 4, 7 and 8, the anode set 10 of each hydrogen fuel cell includes a first electrode plate 11 and a first diversion plate 13 which lies tightly between the first electrode plate 11 and the catalytic layer 30. The gas supply duct 12 penetrates through the first electrode plate 11 and links with the first gas diversion pathway 130 of the first diversion plate 13. The cathode set 20 includes a second electrode plate 21 and a second diversion plate 23 which lies tightly between the second electrode plate 21 and the hydrogen-storage complex metal layer 60. The gas discharge duct 22 penetrates through the second electrode plate 21 and links with the second gas diversion pathway 230 of the second diversion plate 23.

Figure 2:
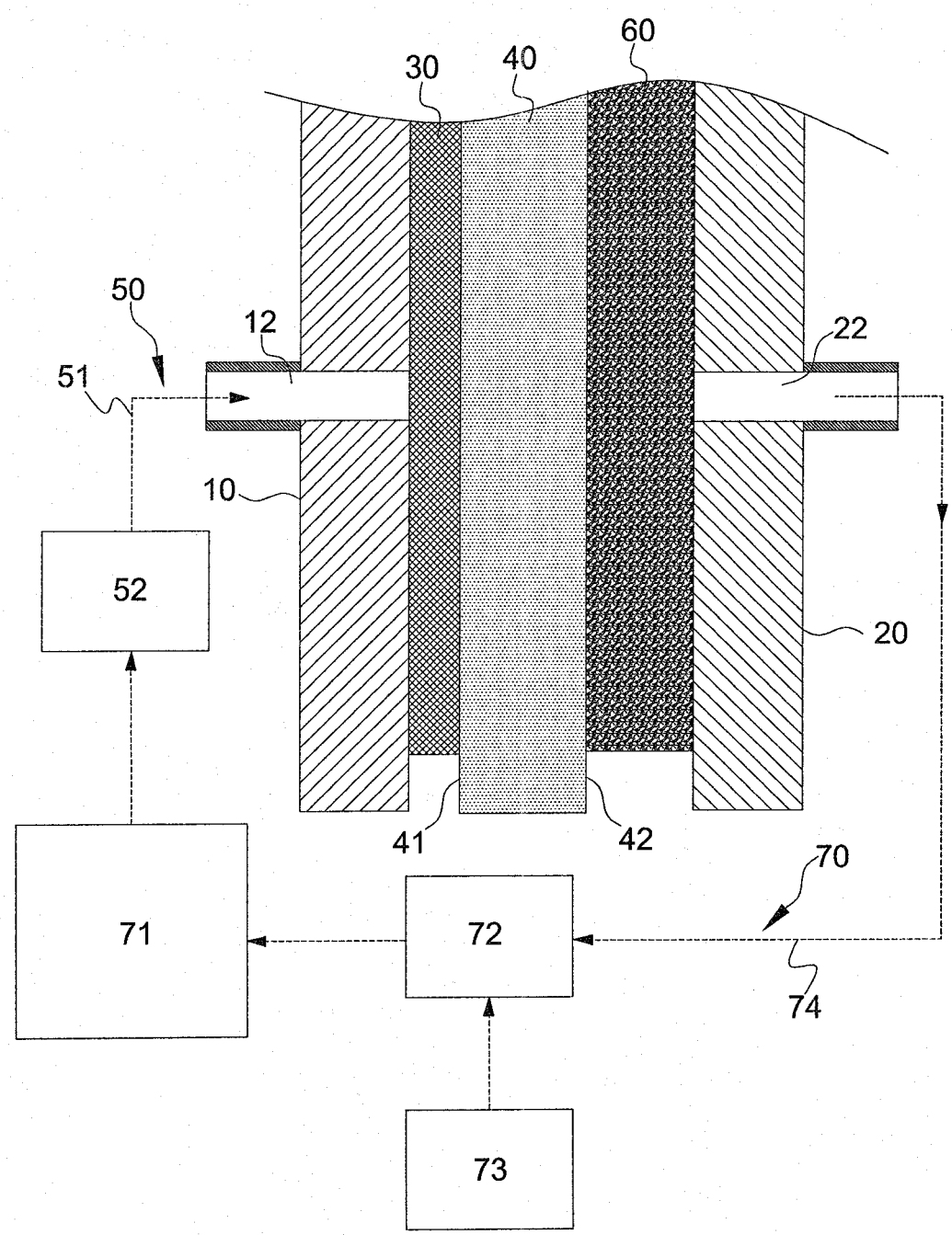
FIG. 2 is an embodiment diagram of the fundamental structure with gas recycling system in accordance with the present invention.

Referring to FIG. 2 and FIG. 4, the hydrogen delivering device 50 includes a gas supply piping 51 linking to the storage tank 71 and a pump 52 attached to the gas supply piping 51. The gas supply piping 51 also links with the gas supply duct 12. The pump 52 is employed to pump the hydrogen from the gas supply piping 51 passing the gas supply duct 12 and the gas diversion pathway 130 and penetrating the catalytic layer 30 which has pores densely distributed for the hydrogen to pass through (not shown in the drawings). The hydrogen drawing device 70 includes a gas drawing piping 74, a vacuum pump 72 attached to the gas drawing piping 74 and a control unit 73 for controlling the vacuum pump 72. One end of the gas drawing piping 73 links to the gas discharge duct 22 and the other end links to the storage tank 71. A specific embodiment of the control unit 73 is a programmable control unit or a regular timer which activates the vacuum pump 72 depending on the amount of the hydrogen stored in the hydrogen-storage complex metal layer 60.

Referring to FIG. 4 to FIG. 8, the present invention has a packing design comprising a first clasp plate 80 tightly clasping onto the exterior side of the anode set 10 and a second clasp plate 81 tightly clasping onto the exterior side of the cathode set 20. The first clasp plate 80 has a penetrated gas inlet 82 whose one end links to the hydrogen delivering device 50 and the other end links to the gas supply duct 12. The second clasp plate 81 has a penetrated gas outlet 83 whose one end links to the hydrogen drawing device 70 and the other end links to the gas discharge duct 22. A plurality of bolts 84 is employed to fasten stacks of required assembly as a complete hydrogen fuel cell set.

Referring to FIG. 7 and FIG. 8, embodiments of the gas supply duct 12 could be holes or tubes in the present invention in order to allow the gas supply duct 12 or the gas discharge duct 22 of the stacked hydrogen fuel cell set to run through each singular hydrogen fuel cell for supplying or drawing hydrogen. The holes or tubes interlink each singular hydrogen fuel cell for the gas supply duct 12 only linking to the first gas diversion pathway 130 of the first diversion plate 13 in each singular hydrogen fuel cell. Therefore, the hydrogen is able to be evenly distributed to the catalytic layer 30 through the first gas diversion pathway 130. Embodiments of the gas discharge duct 22 could be, as well, holes or tubes which also interlink each singular hydrogen fuel cell for the gas discharge duct 22 only linking to the second gas diversion pathway 230 of the second diversion plate 23 in each singular hydrogen fuel cell. Therefore, the hydrogen stored in the complex metal hydrides could be drawn through the second gas diversion pathway 230.

Figure 3:
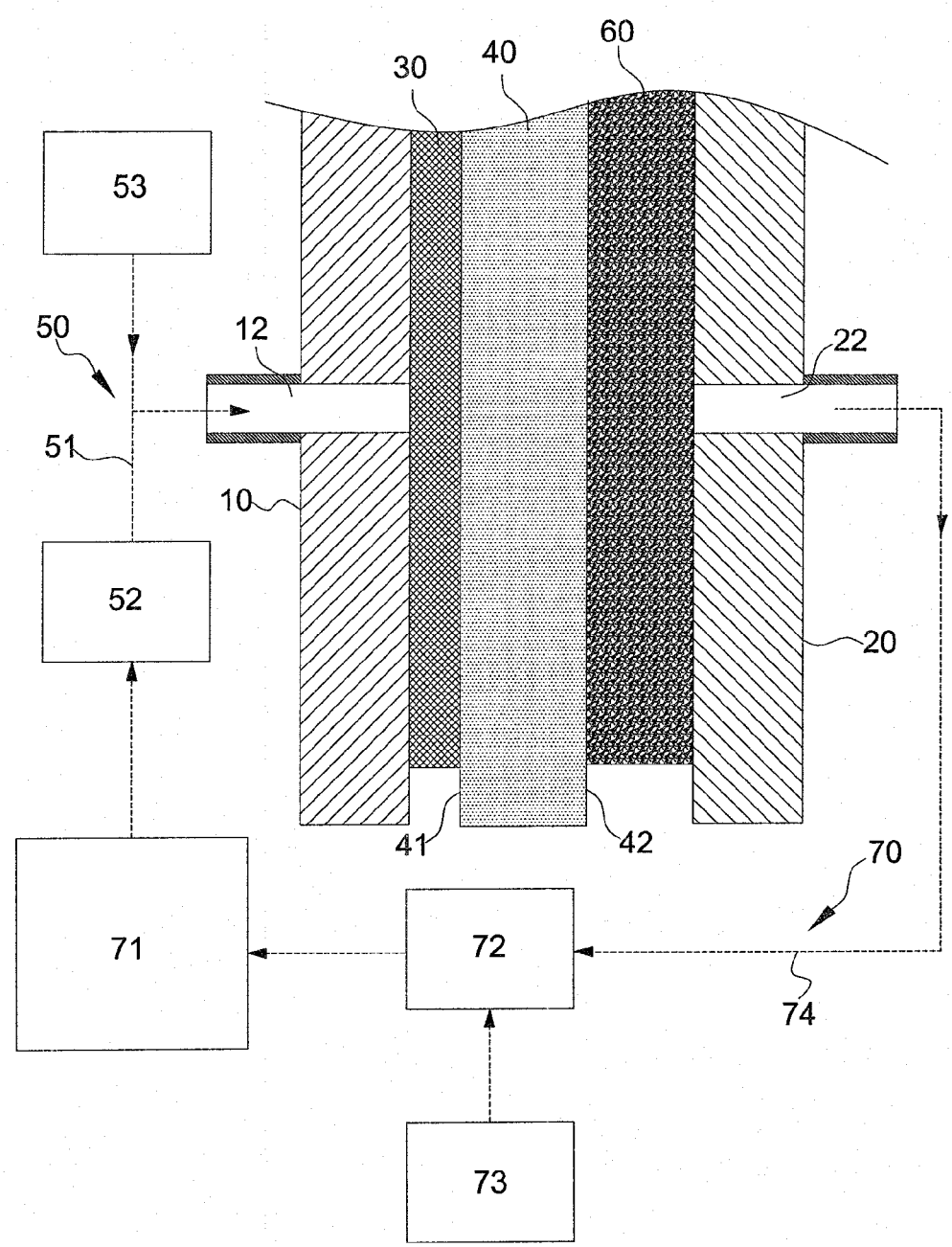
FIG. 3 is another embodiment diagram of the fundamental structure with gas recycling system in accordance with the present invention.

Referring to FIG. 3, the gas supply piping 51 has a moisturizing device 53 installed to produce water molecule moisture delivered along with the hydrogen to the proton exchange membrane 40 in order to improve the conductive efficiency of the hydrogen ions.

IV. Applications of the Present Invention

Referring to FIG. 1 to FIG. 5, the activated hydrogen delivering device 50 delivers hydrogen via the gas supply duct 12 of the anode set 10 to the catalytic layer 30. While passing through the catalytic layer 30, the hydrogen is ionized by the catalytic layer 30 to electrons and hydrogen ions. The electrons move into the cathode set 20 via external load RL circuit 90, and the hydrogen ions pass through the proton exchange membrane 40 and the external load RL circuit 90 to react with the hydrogen-storage complex metal layer 60 (in one experimental example, the hydrogen-storage complex metal layer 60 made by magnesium alloy series) and the electrons to produce complex metal hydrides. The hydrogen-storage complex metal will adsorb and store hydrogen. When the temperature is below 60 Celsius degrees, they will react and produce complex metal hydrides. When the hydrogen adsorbed by the complex metal hydrides is saturated, the control unit 73 will activate the hydrogen drawing device 70. Inasmuch as releasing hydrogen is a special property of the hydrogen-storage complex metal at low pressure (e.g. negative pressure) or high temperature (above 300 Celsius degrees), the hydrogen drawing device 70 draws the hydrogen stored in the complex metal hydrides to a storage tank 71 for further reuse (the hydrogen drawing device 70 is able to generate negative pressure while functioning).

V. Conclusion

The present invention only needs a platinum or palladium catalytic layer and is capable of converting hydrogen ions into recyclable hydrogen. Therefore, the cost reduction of manufacturing material and hydrogen fuel can be achieved, the life cycle of the hydrogen fuel cell can be improved, and the feasibility of business applications of the hydrogen fuel cell can be boosted.

While we have shown and described the embodiment in accordance with the present invention, it should be clear to those skilled in the art that further embodiments may be made without departing from the scope of the present invention.

What is claimed is:

1. A hydrogen-recyclable fuel cell comprising:
   an anode set including a first electrode plate;
   a cathode set including a second electrode plate;
   a proton exchange membrane being located between said first electrode plate and said second electrode plate;
   a catalytic layer being defined between said first electrode plate and said proton exchange membrane, lying against said proton exchange membrane and facing towards said first electrode plate, and forming electrical conductivity with said first electrode plate;
   a hydrogen delivering device delivering hydrogen to said catalytic layer which ionizes hydrogen to electrons and hydrogen ions, said electrons discharged from said first electrode plate to said second electrode plate while said hydrogen ions moving towards said second electrode plate through said proton exchange membrane;
   wherein,
   a hydrogen-storage complex metal layer being defined between said proton exchange membrane and said second electrode plate, said hydrogen-storage complex metal layer lying against said proton exchange membrane and facing towards said second electrode plate and forming electrical conductivity with said second electrode plate; after said hydrogen ions passing through said proton exchange membrane, then said hydrogen ions reacting with said hydrogen-storage complex metal layer and said electrons from said second electrode plate to produce complex metal hydrides; and
   a hydrogen drawing device being employed to draw hydrogen from said complex metal hydrides for further reuse.

2. The hydrogen-recyclable fuel cell as claimed in claim 1, wherein said catalytic layer lies tightly upon a first side of said proton exchange membrane; and said hydrogen-storage complex metal layer is formed by a specific amount of hydrogen-storage complex metal powder via a powder metallurgy process, and lies tightly upon a second side of said proton exchange membrane.

3. The hydrogen-recyclable fuel cell as claimed in claim 1, wherein the catalytic layer lies tightly upon the first electrode plate and faces towards a first side of said proton exchange membrane; said hydrogen-storage complex metal layer is formed by a specific amount of hydrogen-storage complex metal powder via powder metallurgy process, and lies tightly upon said second electrode plate and faces towards a second side of said proton exchange membrane.

4. The hydrogen-recyclable fuel cell as claimed in claim 1, wherein the thickness of said hydrogen-storage complex metal layer is multiple of the thickness of said catalytic layer.

5. The hydrogen-recyclable fuel cell as claimed in claim 1, wherein said anode set includes a gas supply duct and a first diversion plate which lies tightly between said first electrode plate and said catalytic layer; said gas supply duct penetrates through said first electrode plate and links with a first gas diversion pathway of said first diversion plate; said hydrogen delivering device includes a gas supply piping linking to a storage tank and a pump attached to said gas supply piping which links with said gas supply duct; and said pump is employed to pump hydrogen from said gas supply piping passing said gas supply duct and said gas diversion pathway and penetrating said catalytic layer which has pores densely distributed for said hydrogen to pass through.

6. The hydrogen-recyclable fuel cell as claimed in claim 5, wherein said gas supply piping has a moisturizing device installed to produce water molecule moisture delivered along with said hydrogen to said proton exchange membrane.

7. The hydrogen-recyclable fuel cell as claimed in claim 1, wherein said cathode set includes a gas discharge duct and a second diversion plate which lies tightly between said second electrode plate and said hydrogen-storage complex metal layer; said gas discharge duct penetrates through said second electrode plate and links with a second gas diversion pathway of said second diversion plate; said hydrogen drawing device includes a gas drawing piping, a vacuum pump attached to said gas drawing piping and a control unit for controlling said vacuum pump; and one end of said gas drawing piping links to said gas discharge duct and the other end links to a storage tank.

8. The hydrogen-recyclable fuel cell as claimed in claim 1, wherein the material of said hydrogen-storage complex metal layer is selected from the groups of magnesium alloy series, rear earth elements alloy series, titanium alloy series and iron alloy series.

9. The hydrogen-recyclable fuel cell as claimed in claim 1, wherein the material of said catalytic layer is selected from the groups of platinum and palladium.

10. The hydrogen-recyclable fuel cell as claimed in claim 1, wherein a first clasp plate is defined to tightly clasp onto the exterior side of said anode set and a second clasp plate is defined to tightly clasp onto the exterior side of said cathode set; said first clasp plate has a penetrated gas inlet whose one end links to said hydrogen delivering device and the other end links to said gas supply duct; and said second clasp plate has a penetrated gas outlet whose one end links to said hydrogen drawing device and the other end links to said gas discharge duct.

* * * * *